United States Patent
Landwehr et al.

(10) Patent No.: US 10,293,424 B2
(45) Date of Patent: May 21, 2019

(54) BRAZE FOR CERAMIC AND CERAMIC MATRIX COMPOSITE COMPONENTS

(71) Applicant: Rolls-Royce Corporation, Indianapolis, IN (US)

(72) Inventors: Sean E. Landwehr, Avon, IN (US); Scott Nelson, Carmel, IN (US); Jacque Sue Bader, Martinsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 15/144,367

(22) Filed: May 2, 2016

(65) Prior Publication Data

US 2016/0325368 A1 Nov. 10, 2016

Related U.S. Application Data

(60) Provisional application No. 62/157,279, filed on May 5, 2015.

(51) Int. Cl.
*B23K 31/02* (2006.01)
*B23K 1/19* (2006.01)
(Continued)

(52) U.S. Cl.
CPC .............. *B23K 1/19* (2013.01); *B23K 1/002* (2013.01); *B23K 1/0056* (2013.01);
(Continued)

(58) Field of Classification Search
CPC ........ B23K 1/19; B23K 3/0607; B23K 1/002; B23K 35/3612; B23K 35/30;
(Continued)

(56) References Cited

U.S. PATENT DOCUMENTS

| 2,319,323 A | 5/1943 | Heyroth |
| 2,484,650 A | 10/1949 | Ross, Jr. |

(Continued)

FOREIGN PATENT DOCUMENTS

| CN | 101830731 A | 9/2010 | |
| DE | 102007010256 A1 * | 9/2008 | ........... B23K 1/0018 |

(Continued)

OTHER PUBLICATIONS

Czubarow et al. "Application of poly(methylsilane) and Nicalon polycarbosilane precursors as binders for metal/ceramic powders in preparation of functionally graded materials" (1997).*

(Continued)

*Primary Examiner* — Kiley S Stoner
(74) *Attorney, Agent, or Firm* — Shumaker & Sieffert, P.A.

(57) ABSTRACT

The disclosure describes techniques for joining a first part including a ceramic or a CMC and a second part including a ceramic or a CMC using brazing. A technique may include positioning a filler material in a joint region between the first and second parts and a metal or alloy on a bulk surface of the filler material. The metal or alloy may be locally heated to melt the metal or alloy, which may infiltrate the filler material. A constituent of the molten metal or alloy may react with a constituent of the filler material to join the first and second parts. Another technique may include depositing a powder that includes the filler material and the metal or alloy in the joint region. Substantially simultaneously with depositing the powder, the powder may be locally heated. A constituent of the molten metal or alloy may react with a constituent of the filler material to join the first and second parts.

15 Claims, 5 Drawing Sheets

(51) Int. Cl.
*B23K 1/005* (2006.01)
*B23K 35/02* (2006.01)
*B23K 35/30* (2006.01)
*B23K 35/36* (2006.01)
*B23K 1/002* (2006.01)
*B23K 3/06* (2006.01)
*B23K 103/00* (2006.01)

(52) U.S. Cl.
CPC ........ *B23K 3/0607* (2013.01); *B23K 35/0244* (2013.01); *B23K 35/30* (2013.01); *B23K 35/3612* (2013.01); *B23K 35/3613* (2013.01); *B23K 2203/52* (2015.10)

(58) Field of Classification Search
CPC .............. B23K 35/0244; B23K 1/0056; B23K 35/3613; B23K 2203/52; B23K 1/0008; B23K 1/0018; B23K 2203/16–2203/172; B23K 2203/54
USPC .......................................... 29/889.1–889.722
See application file for complete search history.

(56) References Cited

U.S. PATENT DOCUMENTS

| | | | | |
|---|---|---|---|---|
| 3,762,835 | A * | 10/1973 | Carlson | B29C 70/04 416/224 |
| 4,112,135 | A | 9/1978 | Heaps et al. | |
| 5,139,594 | A | 8/1992 | Rabin | |
| 5,164,247 | A * | 11/1992 | Solanki | B22F 7/06 428/213 |
| 5,448,041 | A * | 9/1995 | Benoit | C03B 23/20 156/82 |
| 5,455,206 | A | 10/1995 | Kaun | |
| 5,534,091 | A * | 7/1996 | Okuda | C04B 37/001 156/272.2 |
| 5,666,643 | A * | 9/1997 | Chesnes | B23K 35/0222 148/528 |
| 5,836,505 | A | 11/1998 | Chaumat et al. | |
| 5,840,221 | A | 11/1998 | Lau et al. | |
| 5,890,530 | A | 4/1999 | Schmitt | |
| 5,942,064 | A * | 8/1999 | Krenkel | C04B 37/005 156/89.25 |
| 5,975,407 | A | 11/1999 | Gasse et al. | |
| 6,470,568 | B2 | 10/2002 | Fried et al. | |
| 6,616,032 | B1 | 9/2003 | Gasse et al. | |
| 7,222,775 | B2 | 5/2007 | Chaumat et al. | |
| 7,318,547 | B2 | 1/2008 | Gasse | |
| 7,389,834 | B1 | 6/2008 | Kembaiyan | |
| 8,678,269 | B2 * | 3/2014 | Chaumat | B23K 1/0008 148/24 |
| 8,763,883 | B2 * | 7/2014 | Chaumat | C22C 28/00 219/85.13 |
| 9,056,369 | B2 * | 6/2015 | Chaumat | B23K 1/0008 |
| 9,623,504 | B2 * | 4/2017 | Park | B23K 1/0018 |
| 2006/0213064 | A1 | 9/2006 | Katsumata et al. | |
| 2008/0039062 | A1 | 2/2008 | Laursen et al. | |
| 2008/0131665 | A1 | 6/2008 | Suyama et al. | |
| 2008/0135530 | A1 * | 6/2008 | Lee | B22F 3/1055 219/121.64 |
| 2008/0190552 | A1 | 8/2008 | Bouillon et al. | |
| 2008/0274362 | A1 | 11/2008 | Kramer | |
| 2010/0075160 | A1 * | 3/2010 | Chaumat | B23K 1/0008 428/448 |
| 2010/0098551 | A1 | 4/2010 | Hanrieder et al. | |
| 2011/0039219 | A1 | 2/2011 | Kressman et al. | |
| 2012/0000890 | A1 * | 1/2012 | Ito | B23P 6/007 219/76.1 |
| 2013/0004235 | A1 * | 1/2013 | Chaumat | B23K 1/0008 403/272 |
| 2013/0011185 | A1 * | 1/2013 | Chaumat | B23K 1/0008 403/272 |
| 2013/0064602 | A1 * | 3/2013 | Chaumat | B23K 1/0008 403/272 |
| 2015/0034604 | A1 * | 2/2015 | Subramanian | B33Y 10/00 219/73.21 |
| 2015/0083692 | A1 * | 3/2015 | Bruck | B23K 26/34 219/76.14 |
| 2015/0090773 | A1 * | 4/2015 | Schick | B23K 1/19 228/165 |
| 2015/0275687 | A1 * | 10/2015 | Bruck | B23P 6/007 277/345 |
| 2016/0023957 | A1 * | 1/2016 | Landwehr | C04B 37/003 156/272.6 |
| 2016/0325368 | A1 | 11/2016 | Landwehr et al. | |

FOREIGN PATENT DOCUMENTS

| | | | | |
|---|---|---|---|---|
| EP | | 1127648 A2 * | 8/2001 | .............. B23K 1/19 |
| JP | | 2003286087 A | 10/2003 | |

OTHER PUBLICATIONS

U.S. Appl. No. 14/444,409, Titled "Ceramic-Ceramic Welds", filed Jul. 28, 2014.
Czubarow et al., "Application of Poly(Methylsilane) and Nicalon Polycarbosilane Precursors as Binders for Metal/Ceramic Powders in Preparation of Functionally Graded Materials," Journal of Materials Science, vol. 32, No. 8, Apr. 1997, pp. 2121-2122.
Office Action from U.S. Appl. No. 14/720,438, dated Jan. 5, 2017, 10 pp.
Amendment in Response to Office Action dated Jan. 5, 2018, from U.S. Appl. No. 14/720,438, filed Mar. 28, 2018, 13 pp.
Final Office Action from U.S. Appl. No. 14/720,438, dated Jun. 19, 2018, 10 pages.
Office Action from U.S. Appl. No. 14/720,438, dated Oct. 30, 2018, 12 pp.
Amendment in Response to Office Action dated Oct. 30, 2018, from U.S. Appl. No. 14/720,438, filed Feb. 28, 2019, 10 pp.

* cited by examiner

BRAZE FOR CERAMIC AND CERAMIC MATRIX COMPOSITE COMPONENTS

This application claims the benefit of U.S. Provisional Application No. 62/157,279 filed May 5, 2015, which is incorporated herein by reference in its entirety.

TECHNICAL FIELD

The present disclosure generally relates to brazes for joining ceramic or ceramic matrix composite components.

BACKGROUND

Some articles formed from ceramics or ceramic matrix composites (CMCs) are more easily formed out of multiple parts. For example the geometry of the article may be complex and may be difficult to form in a single piece. However, joining multiple parts formed of a ceramic or a CMC may be difficult, as the melting point of the ceramic or CMC may be very high, or the ceramic or CMC may decompose before melting.

SUMMARY

In some examples, the disclosure describes a method that includes positioning a first part comprising a ceramic or CMC and a second part comprising a ceramic or a CMC adjacent to each other to define a joint region between adjacent portions of the first part and the second part. The method also may include disposing a filler material in the joint region and locally heating a metal or alloy disposed on a bulk surface of the filler material to form a molten metal or alloy. The method additionally may include infiltrating the filler material with the molten metal or alloy. A constituent of the filler material reacts with a constituent of the molten metal or alloy to join the first part and the second part.

In some examples, the disclosure describes an assembly including a first part comprising a ceramic or CMC and a second part comprising a ceramic or a CMC. The first part and second part may be positioned adjacent to each other to define a joint region between adjacent portions of the first part and the second part. The assembly also may include a filler material disposed in the joint region and a metal or alloy disposed on a bulk surface of the filler material. Further, the assembly may include a braze heat source configured to locally heat the metal or alloy when the metal or alloy is disposed on the bulk surface of the filler material.

In some examples, the disclosure describes a method including positioning a first part comprising a ceramic or ceramic matrix composite (CMC) and a second part adjacent to each other to define a joint region between adjacent portions of the first part and the second part. The method also may include depositing a powder comprising a filler material and a metal or alloy in the joint region and, substantially simultaneously with depositing the powder, locally heating at least some of the powder. A constituent of the filler material may react with a constituent of the metal or alloy to join the first part and the second part.

In some examples, the disclosure describes an assembly including a first part comprising a ceramic or ceramic matrix composite (CMC) and a second part comprising a ceramic or a CMC. The first part and second part may be positioned adjacent to each other to define a joint region between adjacent portions of the first part and the second part. The assembly also may include a material delivery device configured to deliver a powder to the joint region. The powder may include a filler material and a metal or alloy, and a constituent of the filler material and a constituent of the metal or alloy may react to join the first part and the second part when heated to a sufficient temperature. The assembly further may include a braze heat source configured to locally heat powder substantially as the powder is delivered to the joint region.

The details of one or more examples are set forth in the accompanying drawings and the description below. Other features, objects, and advantages will be apparent from the description and drawings, and from the claims.

DETAILED DESCRIPTION

The disclosure describes assemblies, systems, and techniques for joining a first part including a ceramic or a ceramic matrix composite (CMC) and a second part including a ceramic or a CMC using brazing. In some examples, techniques described herein may include positioning a filler material in a joint region between the first and second parts and a metal or alloy on a bulk surface of the filler material. The metal or alloy then may be locally heated to melt the metal or alloy. The molten metal or alloy may infiltrate the filler material, and a constituent of the molten metal or alloy may react with a constituent of the filler material to join the first and second parts.

In other examples, techniques described herein may include depositing a powder that includes a filler material and a metal or alloy in a joint region between a first and a second ceramic or CMC part. Substantially simultaneously with depositing the powder, the powder may be locally heated. A constituent of the molten metal or alloy may react with a constituent of the filler material to join the first and second parts.

Techniques describes herein may facilitate joining of two parts each including a ceramic or a CMC. By facilitating joining of multiple parts each including a ceramic or a CMC, components with complex geometry, large size, or both may be more easily made from a ceramic or a CMC, compared to forming the component from a single integral ceramic or CMC.

Techniques describes herein also may utilize localized heating of the braze (which includes the filler material and the metal or alloy). By locally heating the braze or a constituent of the braze, the first and second parts may remain at a lower temperature (e.g., if left unheated or if preheated to a lower temperature than temperature to which the braze is heated). This may facilitate use of brazes that do not include a melting point suppressant, which in turn may improve high temperature capability of the component including the joined first and second parts.

Figure 1:
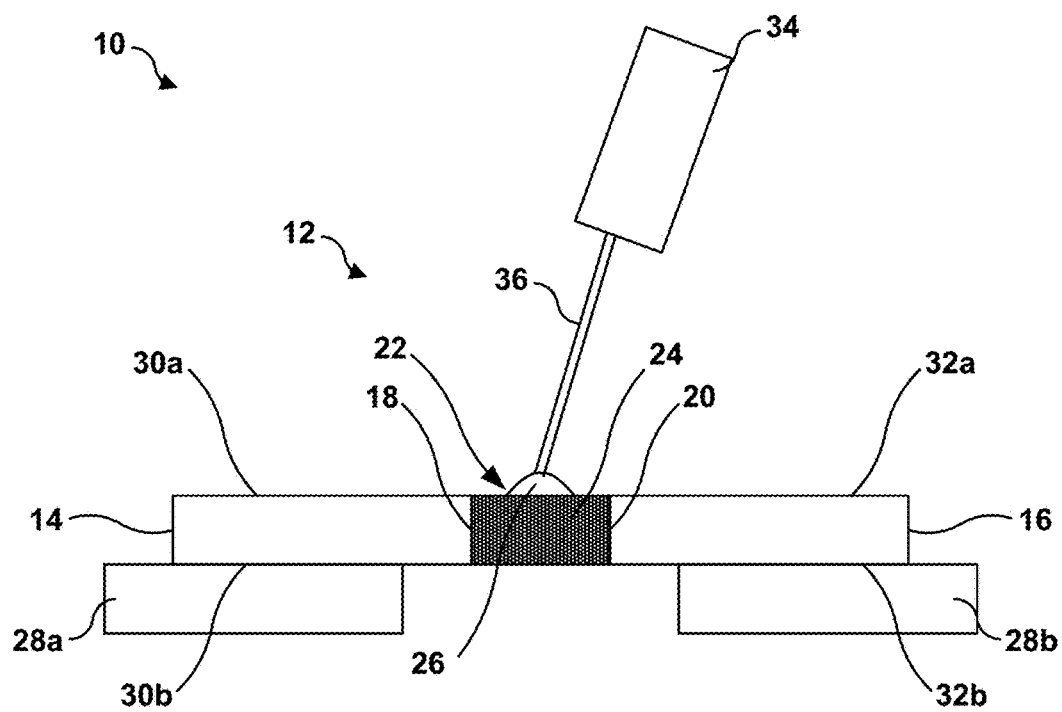
FIG. 1 is a conceptual and schematic diagram illustrating an example assembly for joining a first ceramic or ceramic matrix composite (CMC) part and a second ceramic or CMC part using a filler material and a molten metal or alloy.

FIG. 1 is a conceptual and schematic diagram illustrating an example assembly 10 for joining a first part 14 including a ceramic or a CMC and a second part 16 including a ceramic or a CMC using a filler material 24 and a metal or alloy 26. Assembly 10 includes a system 12 including a braze heat source 34 and, optionally, at least one part preheater 28a and 28b (collectively, "at least one part preheater 28") configured and positioned to preheat at least one of first part 14 or second part 16. Assembly 10 also includes first part 14, second part 16, filler material 24, and metal or alloy 26.

First part 14 and second part 16 may be parts that form a component of a high temperature mechanical system. For example, first part 14 and second part 16 may together be a blade track, an airfoil, a blade, a combustion chamber liner, or the like, of a gas turbine engine. In some examples, first part 14 and second part 16 include a ceramic or a CMC that includes Si. In some examples, first part 14 and second part 16 may include a silicon-based material, such as silicon-based ceramic or a silicon-based CMC.

In some examples in which first part 14 and second part 16 include a ceramic, the ceramic may be substantially homogeneous. In some examples, first part 14 and second part 16 that includes a ceramic includes, for example, silicon carbide (SiC), transition metal carbides (e.g., WC, $Mo_2C$, TiC), transition metal silicides ($MoSi_2$ $NbSi_2$, $TiSi_2$), or the like.

In examples in which first part 14 and second part 16 include a CMC, first part 14 and second part 16 include a matrix material and a reinforcement material. The matrix material includes a ceramic material, such as, for example, silicon metal or SiC. The CMC further includes a continuous or discontinuous reinforcement material. For example, the reinforcement material may include discontinuous whiskers, platelets, fibers, or particulates. As other examples, the reinforcement material may include a continuous monofilament or multifilament weave. In some examples, the reinforcement material may include SiC, C, or the like. In some examples, first part 14 and second part 16 each includes a SiC—Si or a SiC—SiC ceramic matrix composite. For example, first part 14, second part 16, or both may include a SiC—SiC composite consolidated using a silicon-containing alloy. In some examples, first part 14 and second part 16 may be formed of the same material (ceramic or CMC). In other examples, first part 14 may be formed of a different material than second part 16.

Although FIG. 1 illustrates first part 14 and second part 16 as each defining a simple, substantially rectangular geometry, in other examples, first part 14, second part 16, or both may define a more complex geometry, including simple or complex curves, overhangs, undercuts, or the like.

First part 14 defines at least one joint surface 18. Similarly, second part 16 defines at least one joint surface 20. In some examples, joint surfaces 18 and 20 may define complementary shapes. FIG. 1 illustrates joint surfaces 18 and 20 as substantially flat surfaces. In other examples, joint surfaces 18 and 20 may define other, more complex shapes, including, for example, simple or complex curves, overhangs, undercuts, or the like.

First part 14 and second part 16 are positioned such that joint surfaces 18 and 20 are adjacent to each other and define a joint region 22. Joint region 22 may include any kind of joint, including, for example, at least one of a bridle joint, a butt joint, a miter join, a dado joint, a groove joint, a tongue and groove joint, a mortise and tenon joint, a birdsmouth joint, a halved joint, a biscuit joint, a lap joint, a double lap joint, a dovetail joint, or a splice joint. Consequently, joint surfaces 18 and 20 may have any corresponding geometries to define the surfaces of joint region 22.

In some examples, assembly 10 includes at least one part preheater 28. At least one part preheater 28 may be positioned and configured to heat at least one of first part 14 or second part 16. In some examples, at least one part preheater 28 may be used to heat at least one of first part 14 or second part 16 before introducing filler material 24 in joint region 22, before introducing metal or alloy 26 on a bulk surface of filler material 24, or before locally heating metal or alloy 26. In some examples, at least one part preheater 28 may heat at least one of first part 14 or second part 16 using convection, radiation, or conduction. At least one part preheater 28 may be configured to heat at least one of first part 14 or second part 16 to a temperature between about 500 and about 1200° C.

Assembly 10 also includes a filler material 24 in joint region 22 between joint surfaces 18 and 20. Filler material 24 may include a constituent of the braze material. For example, filler material 24 may include a constituent that reacts with a constituent of metal or alloy 26 to form a solid and join first part 14 and second part 16.

In some examples, filler material 24 may include a ceramic material, one or more transition metals (e.g., titanium, cobalt, molybdenum, nickel, vanadium, chromium, copper, tantalum, niobium or yttrium, zirconium), carbon, or the like. Example ceramic materials for filler material 24 include transition metal carbides (e.g., molybdenum carbide, cobalt carbide, titanium carbide, tungsten carbide, vanadium carbide, niobium carbide, tantalum carbide, zirconium carbide or chromium carbide) transition metal borides (e.g., molybdenum boride, cobalt boride, titanium boride, tungsten boride, vanadium boride, niobium boride, tantalum boride, or chromium boride), transition metal silicides (e.g., titanium silicide, yttrium silicide, molybdenum silicide, or tungsten silicide), and SiC. In some examples, filler material 24 may include a mixture of at least two of these materials, such as SiC and a transition metal, SiC and carbon, or the like.

Filler material 24 may be in the form of a powder, particulate, fiber, sheet, or the like. In some examples, filler material 24 includes a loose powder, particulate, fiber, or the like. In other examples, filler material 24 may include a carbon-containing sheet. In some examples, filler material 24 may include combinations of two or more of these forms, e.g., a carbon-containing sheet impregnated with a powder or particulate.

In some examples, filler material 24 may be bound with a binder, such as an organic binder. For example, the binder may bind powder particulate or fibers in a tape, an injection molded material, or the like. The binder may hold filler material 24 in a relatively pliable form, which may facilitate handling and forming of filler material 24 within joint region 22.

In some examples, the organic binder may include at least one of a high char yielding component or a preceramic polymer. In some examples, the high char yielding component may include a phenolic or furan based material, such as furfuryl alcohol or phenol formaldehyde. The high char yielding component may act as a carbon source during the brazing technique. In some examples, the preceramic polymer includes a polycarbosilane, which may be a precursor to SiC.

Because filler material 24 is in the form of a powder, particulate, fiber, sheet, or the like, filler material 24 may include porosity or may form porosity during the brazing technique, e.g., due to melting or burning of any binder in filler material 24. Porosity may allow infiltration of molten metal or alloy 26 during the brazing technique, as will be described in further detail below. For example, the porosity, defined by the volume fraction of powder divided by the total volume of joint region 22, may be between about 15 vol. % and about 50 vol. %.

Metal or alloy 26 may be disposed on a bulk surface of filler material 24, as shown in FIG. 1. Metal or alloy 26 includes a second constituent of a braze material, e.g., a constituent that reacts with a constituent of filler material 24 to join first and second parts 14 and 16. For example, metal or alloy 26 may include silicon metal or a silicon alloy. Example binary silicon alloys may include, silicon-titanium (e.g., between about 20 wt. % Ti and about 25 wt. % Ti), silicon-yttrium (e.g., between about 25 wt. % Y and about 35 wt. % Y), silicon-niobium (e.g., between about 5 wt. % Nb and about 10 wt. % Nb), silicon-iron (e.g., about 35 wt. % Fe), silicon-nickel (e.g., between about 30 wt. % Ni and about 40 wt. % Ni) silicon-chromium (e.g., between about 10 wt. % Cr and about 20 wt. % Cr), silicon-cobalt (e.g., between about 30 wt. % Co and about 40 wt. % Co), and silicon-boron (e.g., between about 5 wt. % B and about 10 wt. % B).

Metal or alloy 26 may be in the form of a powder, particulate, or the like. In some examples, metal or alloy 26 is a loose powder, particulate, or the like.

In some examples, metal or alloy 26 may be bound with a binder, such as an organic binder. For example, the binder may bind powder particulate or fibers in a tape, an injection molded material, or the like. The binder may hold metal or alloy 26 in a relatively pliable form, which may facilitate handling and forming of metal or alloy 26 on to the bulk surface of filler material 24.

In some examples, the organic binder may include at least one of a high char carbon yielding component or a preceramic polymer. In some examples, the high char carbon yielding component may include a phenolic or furan based organic material, such as furfuryl alcohol or phenol formaldehyde. The high char carbon yielding component may act as a carbon source during the brazing technique. In some examples, the preceramic polymer includes a polycarbosilane, which may be a precursor to SiC.

Assembly 10 also may include braze heat source 34. Braze heat source 34 may be configured to generate energy 36 to locally heat metal or alloy 26 to melt metal or alloy 26 e.g., at a temperature between about 1200° C. and about 1400° C., depending on the composition of the metal or alloy, such that metal or alloy 26 infiltrates filler material 24. In some examples, braze heat source 34 may include a laser or an inductive heat source.

As metal or alloy 26 infiltrates filler material 24, a constituent from metal or alloy 26 reacts with a constituent of filler material 24. For example, silicon metal from metal or alloy 26 may react with carbon from filler material 24. The reaction product may be a solid material, such as, for example, silicon carbide. The formation of the solid reaction product may join first part 14 and second part 16.

Because molten metal or alloy 26 infiltrates filler material 24 from a bulk surface of filler material 24, filler material 24 may be porous or may become porous as molten metal or alloy 26 infiltrates filler material 24. For example, if filler material 24 includes a binder, molten metal or alloy 26 may melt or char the binder, which may open porosity in filler material 24. Porosity of filler material 24 may be selected such that molten filler material 24 may infiltrate the filler material 24 throughout a volume of joint region 22.

Figure 2A:
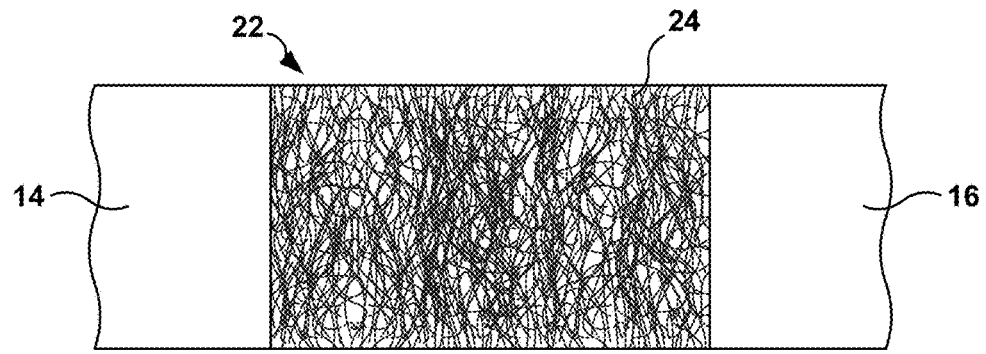
FIGS. 2A and 2B are conceptual and schematic diagrams illustrating an example joint region between a first ceramic or CMC part and a second ceramic or CMC.
Figure 2B:
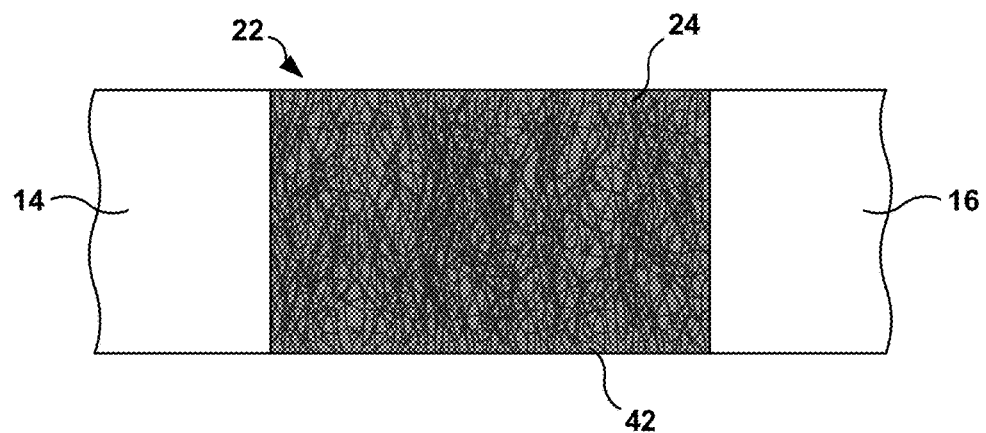

FIGS. 2A and 2B are conceptual and schematic diagrams illustrating an example joint between first part 14 and second part 16. As shown in FIG. 2A, before introduction of molten metal or alloy 26 to joint region 22, filler material 24 is positioned in joint region 22. As shown in FIG. 2A, filler material 24 may be a porous material, defining pores between the powder, particulates, fibers, or the like.

After introduction of molten metal or alloy 26 to joint region 22, a constituent from molten metal or alloy 26 (e.g., silicon) reacts with a constituent from filler material 24 (e.g., carbon) to form a solid (e.g., silicon carbide), which joins first part 14 and second part 16. The reaction between the constituent from metal or alloy 26 and the constituent from filler material 24 may continue as molten metal or alloy 26 propagates through joint region 22. As the constituents react to form a solid, the solid may form a matrix phase 42, as shown in FIG. 2B. In some examples, joint region 22 may include excess filler material 24, such that not all filler material 24 reacts with the constituent from metal or alloy 26.

Figure 3:
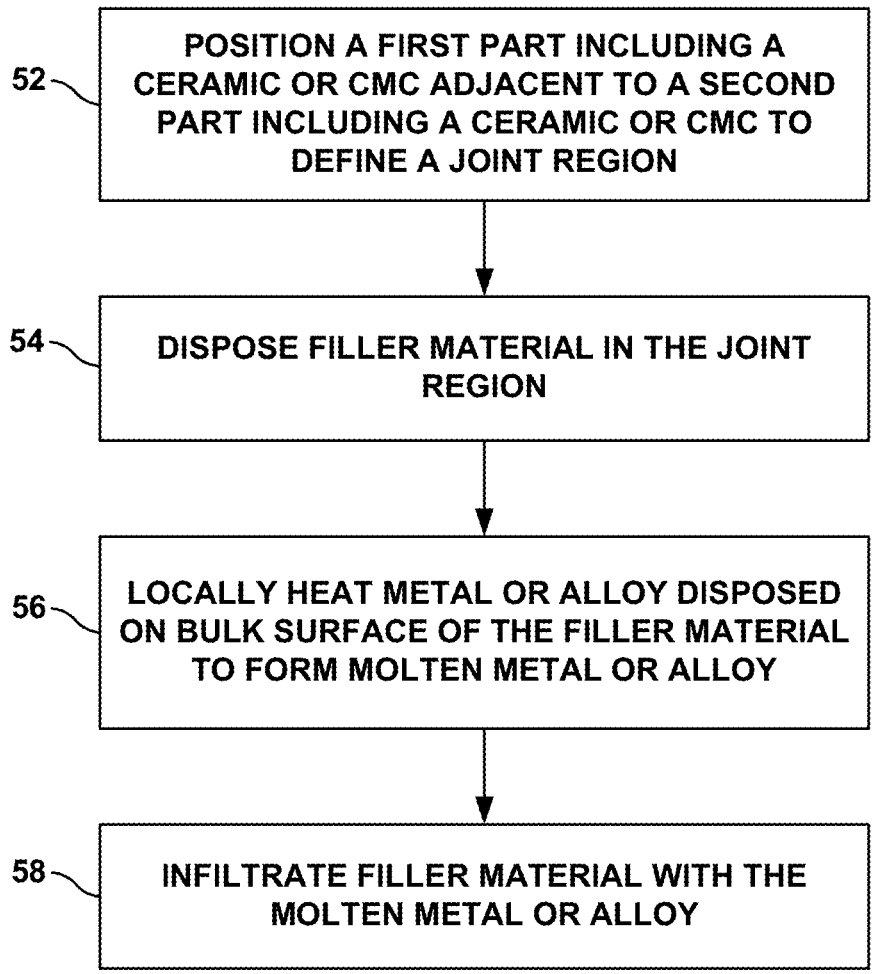
FIG. 3 is a flow diagram illustrating an example technique for joining a first part including a ceramic or CMC and a second part including a ceramic or CMC using a filler material and a molten metal or alloy.

FIG. 3 is a flow diagram illustrating an example technique for joining a first part including a ceramic or CMC and a second part including a ceramic or CMC using a filler material and a molten metal or alloy. Although the technique of FIG. 3 will be described with concurrent reference to assembly 10 of FIG. 1, in other examples, the technique of FIG. 3 may be performed by another assembly.

The technique of FIG. 3 may include positioning first part 14 adjacent to second part 16 to define joint region 22 (52). As described above, first joint surface 18 and second joint surface 20 may define joint region 22, which may include any type of joint.

The technique of FIG. 3 also may include disposing filler material 24 in joint region 22 (54). The filler material may include, for example, a powder, particulate, or fiber in loose form or mixed with a binder to form a tape, preform, or the like. In some examples, filler material 24 includes a ceramic material, one or more transition metals, carbon, or the like.

The technique of FIG. 3 further may include locally heating metal or alloy 26 disposed on a bulk surface of filler material 24 to form a molten metal or alloy (56). The molten metal or alloy may infiltrate filler material 24 (58). As the molten metal or alloy infiltrates filler material 24 (58), a constituent of the molten metal or alloy may react with a constituent of filler material 24 to form a solid material. For example, the molten metal or alloy may include silicon metal or a silicon alloy and filler material 24 may include carbon or a carbon source. Silicon and carbon may react to form solid silicon carbide. The solid material, e.g., silicon carbide may join first and second parts 14 and 16. The molten metal or alloy may infiltrate substantially all of joint region 22, and a constituent of the molten metal or alloy may react with a constituent of filler material 24 substantially throughout joint region 22, which may result in a relatively strong joining of first and second parts 14 and 16.

In some examples, such as when one or both of filler material 24 and metal or alloy 26 includes an organic binder including at least one of a high char carbon yielding component or a preceramic polymer, locally heating metal or alloy 26 disposed on a bulk surface of filler material 24 to form a molten metal or alloy (56), infiltrating the molten metal or alloy into filler material 24 (58), or both may carbonize the high char carbon yielding component, form a ceramic from the preceramic polymer, or both. In some examples, the carbon from the high char carbon yielding component may react with a metal from the molten metal or alloy to form a ceramic.

In some examples, as the molten metal or alloy infiltrates filler material 24 (58), forces may be exerted on first and second parts 14 and 16 to urge first joint surface 18 toward second joint surface 20, which may assist in joining first and second parts 14 and 16.

Figure 4:
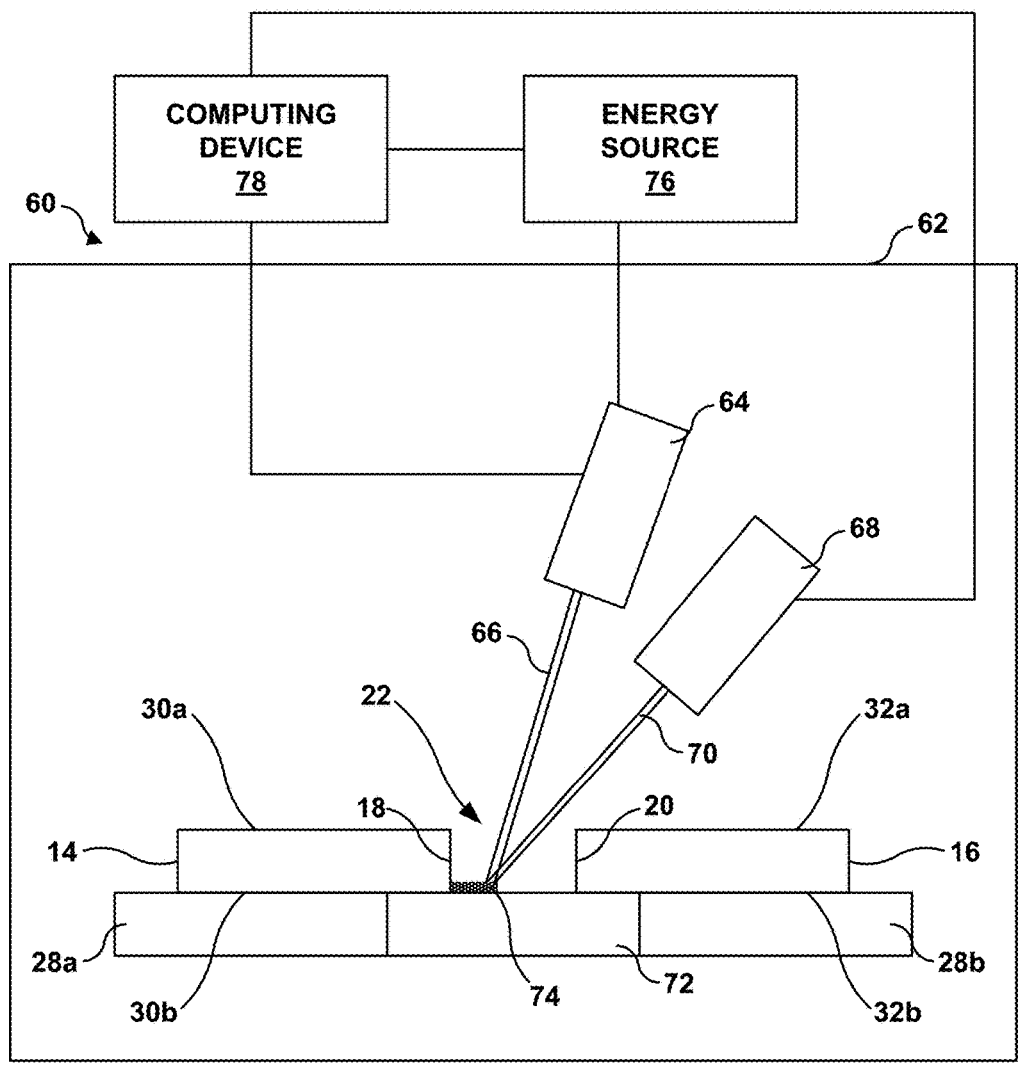
FIG. 4 is a conceptual and schematic diagram illustrating an example assembly for joining a first part including a ceramic or CMC and a second part including a ceramic or CMC using a powder including a filler material and a metal or alloy.

FIGS. 1-3 illustrate an example assembly and technique in which the filler material is disposed in the joint and the metal or alloy added later in a molten form. In other examples, an assembly may be configured to deliver a braze material to a joint region in powder form while substantially simultaneously heating the braze material. FIG. 4 is a conceptual and schematic diagram illustrating an example assembly for joining a first part including a ceramic or CMC and a second part including a ceramic or CMC using a powder including a filler material and a metal or alloy.

Assembly 60 may include an enclosure 62, which encloses an energy delivery head 64 and a material delivery device 68. Assembly 60 also may include an energy source 76, which is operatively coupled to energy delivery head 64. Assembly 60 further may include a computing device 78, which is communicatively connected to energy source 76, energy delivery head 64, and material delivery device 68. First part 14, second part 14, and at least one part heat source 28 are also positioned within enclosure 62.

Energy source 76 may include, for example, a laser source, such as a CO laser, a $CO_2$ laser, a Nd:YAG laser; an electron beam source, a plasma source; or the like. Energy source 76 may be selected to provide energy with a predetermined wavelength or wavelength spectrum that may be absorbed by powder braze material 70. Energy source 76 may be operatively connected to energy delivery head 64, which aims an energy beam 66 toward joint region 22 between first part 14 and second part 16 during joining of first and second parts 14 and 16.

Assembly 60 also may include at least one material delivery device 68. Material delivery device 68 may be configured to deliver powder braze material 70 to the location 74 of joint region 22 at which energy beam 66 is aimed. Powder braze material 70 then may be heated by energy delivered by energy delivery head 64 to melt at least part of powder braze material 70.

In some examples, assembly 60 may include a single material delivery device 68, as shown in FIG. 4. In some of these examples, powder braze material 70 may include both a filler material and a metal or alloy. The filler material and the metal or alloy may be similar to or substantially the same as filler material 24 and metal or alloy 26 described above with reference to FIGS. 1-3, and may or may not include a binder (also in powder form). The binder may act as a carbon source, be a preceramic polymer, or both.

In other examples, assembly 60 may include multiple material delivery devices 68. For example, a first material delivery device may deliver the filler material (with or without a powder binder material) to joint region 22 and a second material delivery device may deliver the metal or alloy (with or without a powder binder material) to joint region 22. In examples in which assembly 60 includes multiple material delivery devices, assembly may include a single energy delivery head 64, more than one energy delivery head 64 (e.g., a respective energy delivery head 64 for each material delivery device), or the like.

In some examples in which assembly 60 includes multiple material delivery devices 68, the multiple delivery devices 68 may deliver respective material to joint region 22 in an alternating fashion to create layers of the respective materials, or may delivery respective material to joint region 22 substantially simultaneously to create a mixture (e.g., a substantially homogeneous mixture) of the respective materials within joint region 22. For example, in some examples in which assembly 60 includes a first material delivery device that delivers filler material and a second material delivery device that delivers a metal or alloy, the first and second material delivery devices may deliver the filler material and the metal or alloy in alternating fashion to form alternating layers or may deliver the filler material and the metal or alloy to joint region 22 substantially simultaneously to form a mixture (e.g., a substantially homogeneous mixture) of the filler material and the metal or alloy within joint region 22.

In some examples, energy delivery head 64 may be coupled to or integral with material delivery device 68. For example, a device may include a central aperture through which energy beam 66 passes and which aims energy beam 66 and at least one channel and nozzle through which powder braze material 70 is delivered. A single device that include energy delivery head 64 and material delivery device 68 may facilitate aiming of powder braze material 70 and focusing of energy beam 66 at a substantially similar location 74. In other examples, material delivery device 30 may be separate from energy delivery head 16.

Computing device 26 may include, for example, a desktop computer, a laptop computer, a workstation, a server, a mainframe, a cloud computing system, or the like. Computing device 26 may include or may be one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality of computing device 26 may be provided within dedicated hardware and/or software modules.

Computing device 78 is configured to control operation of assembly 60, including, for example, energy source 76, energy delivery head 64, and/or material delivery device 68. Computing device 78 may be communicatively coupled to at least one of energy source 76, energy delivery head 64, and/or material delivery device 68 using respective communication connections. Such connections may be wireless and/or wired connections.

Computing device 78 may be configured to control operation of energy delivery head 64, material delivery device 68, or both to position joint region 22 relative to energy delivery head 64, material delivery device 68, or both. For example, computing device 78 may control energy delivery head 64, material delivery device 68, or both to translate and/or rotate along at least one axis to energy delivery head 64, material delivery device 68, or both relative to joint region 22.

Computing device 78 may control at least one of the power level of energy source 76, the focal spot size of energy beam 66 delivered to joint region 22, the relative movement of the focal spot of energy beam 66 relative to joint region 22, a pause time between bursts of energy, the angle of energy beam 66 relative to joint region 22, or the like. Computing device 78 may control the at least one of these parameters to control the amount of heat delivered to powder braze material 70 at a given time. In some examples, computing device 78 may control energy delivery head 64 to scan (e.g., translate) relative to joint region 22 to scan the focal spot relative to joint region 22, and powder braze material 70 may be fused in a general shape corresponding to the scanned path of the focal spot.

Figure 5:
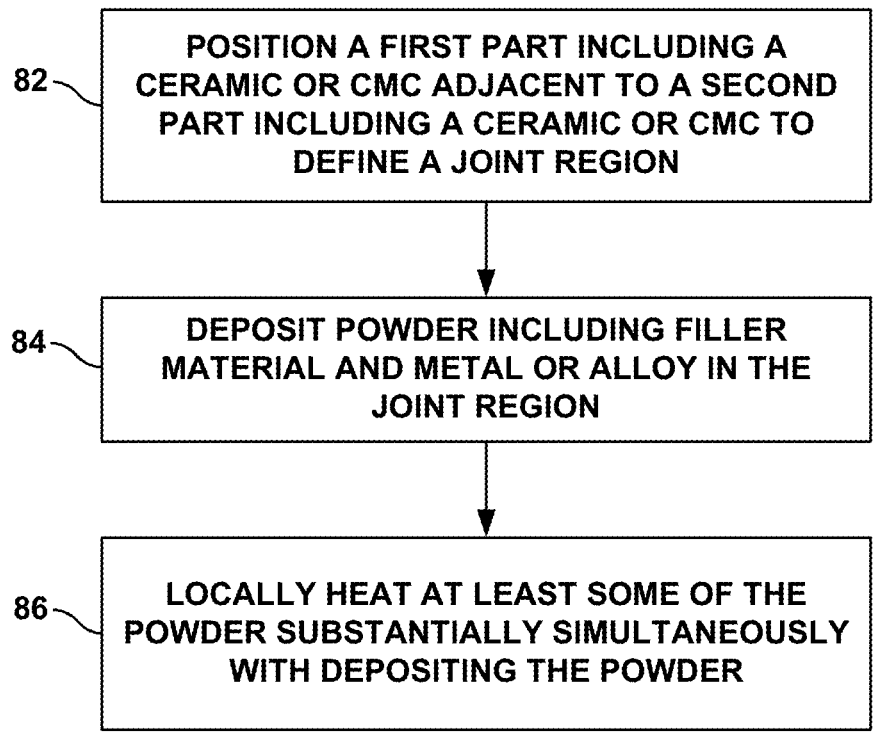
FIG. 5 is a flow diagram illustrating an example technique for joining a first part including a ceramic or CMC and a second part including a ceramic or CMC part using a powder including a filler material and a metal or alloy.

In accordance with examples of this disclosure, assembly 60 may be used to join first part 14 and second part 16. FIG. 5 is a flow diagram illustrating an example technique for joining first part 14 and second part 16 using a powder braze material 70 including a filler material and a metal or alloy. Although the technique of FIG. 5 will be described with concurrent reference to assembly 60 of FIG. 4, in other examples, the technique of FIG. 5 may be performed by another assembly.

The technique of FIG. 5 may include positioning first part 14 adjacent to second part 16 to define joint region 22 (82). As described above, first joint surface 18 and second joint surface 20 may define joint region 22, which may include any type of joint.

The technique of FIG. 5 also may include depositing, by material delivery device 68, under control of computing device 78, powder braze material 70 in joint region 22 (84). Powder braze material 70 may include a filler material, which may be similar to or substantially the same as filler material 24 of FIG. 1. Powder braze material 70 also may include a metal or alloy, which may be similar to or substantially the same as metal or alloy 26 of FIG. 1. In some examples, powder braze material 70 may be deposited in joint region 22 by a single material delivery device 68. In other examples, powder braze material 70 may be deposited in joint region 22 by multiple material delivery devices, e.g., a first material delivery device that deposits the powder filler material and a second material delivery device that deposits the powder metal or alloy.

The technique of FIG. 5 further may include locally heating, by energy delivery head 64, under control of computing device 78, at least some of powder braze material 70 (86). In some examples, the at least some of powder braze material 70 may be heated by energy delivery head 64 substantially as powder braze material 70 is deposited in joint region 22 (84) (e.g., at location 74). As the powder braze material 70 is locally heated (86), a constituent of the metal or alloy in powder braze material 70 may react with a constituent of the filler material in powder braze material 70 to form a solid material. For example, the metal or alloy may include silicon metal or a silicon alloy and the filler material may include carbon or a carbon source. Silicon and carbon may react to form solid silicon carbide. The solid material, e.g., silicon carbide may join first and second parts 14 and 16.

In some examples, such as when powder braze material 70 includes an organic binder including at least one of a high char carbon yielding component or a preceramic polymer, locally heating at least some of powder braze material 70 (86) may carbonize the high char carbon yielding component, form a ceramic from the preceramic polymer, or both. In some examples, the carbon from the high char carbon yielding component may react with a metal from the molten metal or alloy to form a ceramic.

Because material delivery device 68 delivers powder braze material 70 and energy delivery head 64 aims energy beam 66 at location 74, powder braze material 70 may be reacted to form a solid at location 74. Computing device 78 may control material delivery device 68 and energy delivery head 64 to scan location 74 within joint region 22 to add powder braze material 70 throughout joint region 22. After scanning location 74 throughout joint region 22, joint region 22 may be filled with solid material, and first part 14 and second part 16 may be joined by the solid material.

In some examples, as powder braze material 70 is deposited (84) and locally heated (86), forces may be exerted on first and second parts 14 and 16 to urge first joint surface 18 toward second joint surface 20, which may assist in joining first and second parts 14 and 16.

Various examples have been described. These and other examples are within the scope of the following claims.

What is claimed is:

1. A method comprising:
   positioning a first part comprising a ceramic or ceramic matrix composite (CMC) and a second part comprising a ceramic or a CMC adjacent to each other to define a joint region between adjacent portions of the first part and the second part;
   disposing a blend of a filler material and an organic binder comprising at least one of a furan-based organic, a phenol-based organic, or a preceramic polymer comprising polycarbosilane in the joint region;
   locally heating a metal or alloy disposed on a bulk surface of the filler material to form a molten metal or alloy;
   infiltrating the filler material with the molten metal or alloy, wherein a constituent of the filler material reacts with a constituent of the molten metal or alloy to join the first part and the second part.

2. The method of claim 1, wherein the filler material comprises at least one of particulates, fibers, or sheets, and wherein the at least one of particulates, fibers, or sheets comprise at least one of silicon carbide, carbon, a transition metal, a transition metal carbide, a transition metal boride, or a transition metal silicide.

3. The method of claim 1, wherein the metal or alloy disposed on the bulk surface of the filler material silicon metal or a silicon alloy.

4. The method of claim 1, further comprising heating at least one of the first part or the second part with a part preheater before locally heating the metal or alloy.

5. The method of claim 4, wherein heating at least one of the first part or the second part with the part preheater comprises heating at least one of the first part or the second part to a temperature between about 500° C. and about 1200° C.

6. The method of claim 1, further comprising heating at least one of the first part or the second part with a part preheater before disposing the blend of the filler material and the organic binder comprising at least one of the furan-based organic, the phenol-based organic, or the preceramic polymer comprising polycarbosilane in the joint region.

7. The method of claim 1, wherein the filler material comprises a mixture of silicon carbide and a transition metal or a mixture of silicon carbide and carbon.

8. The method of claim 1, wherein the organic binder binds the filler material in a tape.

9. The method of claim 1, wherein the metal or alloy comprises a binary silicon alloy.

10. The method of claim 9, wherein the binary silicon alloy comprises at least one of silicon-titanium alloy, silicon-yttrium alloy, silicon-niobium alloy, silicon-iron alloy, silicon-nickel alloy, silicon-chromium alloy, silicon-cobalt alloy, or silicon-boron alloy.

11. The method of claim 1, wherein the metal or alloy comprises a metal or alloy powder.

12. The method of claim 11, wherein the metal or alloy powder is bound in a tape with an organic binder.

13. The method of claim 12, wherein the organic binder comprises at least one of a furan-based organic, a phenol-based organic, or a preceramic polymer comprising polycarbosilane.

14. The method of claim 1, wherein locally heating the metal or alloy comprises locally heating the metal or alloy to a temperature between about 1200° C. and about 1400° C.

15. The method of claim 1, wherein the filler material comprises carbon, wherein the metal or alloy comprises silicon, and wherein the silicon reacts with the carbon to form silicon carbide.

* * * * *